US010183744B2

(12) United States Patent
Gamble (10) Patent No.: US 10,183,744 B2
(45) Date of Patent: Jan. 22, 2019

(54) MAGNETIC ORIENTATION DETENT (71) Applicant: Lockheed Martin Corporation, Bethesda, MD (US)

(72) Inventor: Dustin Eli Gamble, San Luis Obispo, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 15/040,428

(22) Filed: Feb. 10, 2016

(65) Prior Publication Data

US 2017/0225779 A1 Aug. 10, 2017

(51) Int. Cl.
*B64C 29/00* (2006.01)
*B64C 27/30* (2006.01)

(52) U.S. Cl.
CPC .......... *B64C 29/0025* (2013.01); *B64C 27/30* (2013.01); *B64C 29/0091* (2013.01)

(58) Field of Classification Search
CPC ............ B64C 29/0025; B64C 29/0091; B64C 29/001; B64C 27/30; B64C 27/14; B64C 27/24; H01F 7/0242; F03D 7/0248; F03D 7/06; H01H 2003/506; H01H 3/52; H01H 19/54; F04D 27/00; F04D 27/004; F04D 27/008; H02K 1/2726; H02K 21/54
USPC ............ 416/152, 32, 169 R, 170 R; 417/214
See application file for complete search history.

(56) References Cited

U.S. PATENT DOCUMENTS

| | | | |
|---|---|---|---|
| 2,959,373 A | 11/1960 | Zuck | |
| 3,693,911 A | 9/1972 | Bacon | |
| 5,337,030 A * | 8/1994 | Mohler | H01F 7/145 310/156.37 |
| 5,454,530 A | 10/1995 | Rutherford | |
| 6,293,491 B1 * | 9/2001 | Wobben | B64C 27/00 244/17.23 |
| 6,669,137 B1 | 12/2003 | Chen | |
| 7,589,608 B2 * | 9/2009 | Decker | B64C 1/1407 335/220 |

(Continued)

FOREIGN PATENT DOCUMENTS

| | | |
|---|---|---|
| CN | 205524941 | 8/2016 |
| EP | 3 205 577 A1 | 2/2017 |

(Continued)

OTHER PUBLICATIONS

EP Communication, extended European Patent Search, regarding Appln. No. 17155672.3-1754, dated May 10, 2017.

(Continued)

*Primary Examiner* — Richard R. Green
*Assistant Examiner* — Vicente Rodriguez
(74) *Attorney, Agent, or Firm* — Bracewell LLP (57) ABSTRACT

In one embodiment, a hybrid aircraft includes a fixed-wing propulsion system and a multirotor propulsion system. The multirotor propulsion system includes a propeller coupled to a motor shaft. A motor drives the propeller via the motor shaft. The hybrid aircraft further includes a magnetic orientation detent to prevent the propeller of the multirotor propulsion system from rotating when power to the multirotor propulsion system is removed. The magnetic orientation detent further includes a plurality of magnets coupled to the circumference of the motor shaft and a detent magnet magnetically coupled to the plurality of magnets.

19 Claims, 5 Drawing Sheets

(56) References Cited

U.S. PATENT DOCUMENTS

| | | | |
|---|---|---|---|
| 8,584,983 | B2 | 11/2013 | Sirohi |
| 8,690,096 | B2 | 4/2014 | Calderon |
| 9,199,733 | B2 | 12/2015 | Keennon |
| 9,334,049 | B1 | 5/2016 | LeGrand, III |
| 2002/0125977 | A1 | 9/2002 | VanZoest |
| 2006/0060708 | A1 | 3/2006 | Decker |
| 2007/0109082 | A1* | 5/2007 | Potter ............... H02K 7/106 335/22 |
| 2009/0306829 | A1 | 12/2009 | Hildebrand |
| 2009/0314562 | A1* | 12/2009 | Soderberg ............ B64C 25/36 180/65.51 |
| 2012/0207598 | A1 | 8/2012 | Eyraud |
| 2013/0251525 | A1 | 9/2013 | Saiz |
| 2013/0300242 | A1* | 11/2013 | Yamada ............ H02K 21/044 310/156.08 |
| 2014/0346283 | A1* | 11/2014 | Salyer ................. B64C 37/00 244/7 A |
| 2016/0280364 | A1 | 9/2016 | Korhonen |
| 2017/0166304 | A1* | 6/2017 | Erdozain, Jr. ........ B64C 27/58 |

FOREIGN PATENT DOCUMENTS

| | | |
|---|---|---|
| WO | WO 2013/066477 A2 | 5/2013 |
| WO | WO 2013/066477 A3 | 5/2013 |
| WO | WO 2014/021798 A2 | 2/2014 |
| WO | WO 2014/021798 A3 | 2/2014 |
| WO | WO 2014/032032 A1 | 2/2014 |

OTHER PUBLICATIONS

U.S. Appl. No. 15/338,832, filed Oct. 31, 2016, Dustin Eli Gamble.
EPO Communication and extended European search report re Application No. 17194874.8-1010 Reference JL91142P.EPP), dated Feb. 16, 2018.
EPO Communication re Application No. 17117 155 67236-1010 Reference JL87601P.EPP); dated Apr. 30, 2018.
EPO Communication re Application No. 17155672.3-1010 Reference JL87601P.EPP); dated Apr. 30, 2018.

\* cited by examiner

MAGNETIC ORIENTATION DETENT

TECHNICAL FIELD

This disclosure generally relates to aircraft operation and, more specifically, to a magnetic orientation detent.

BACKGROUND

Fixed-wing aircraft perform a number of commercial, military, and civilian tasks. Once airborne, fixed-wing aircraft are power efficient and effective at cruising for long distances. Yet, fixed-wing aircraft typically require sufficient runway space for takeoff and landing. Recently, hybrid aircraft have incorporated a multirotor system with the fixed-wing aircraft. The multirotor system allows the hybrid aircraft to take off and land vertically, while the fixed-wing system is used for flying once airborne. However, the multirotor system may interfere with the flying capabilities of the fixed-wing aircraft.

SUMMARY OF PARTICULAR EMBODIMENTS

In accordance with the present disclosure, disadvantages and problems associated with a magnetic orientation detent may be reduced or eliminated.

In one embodiment, a hybrid aircraft includes a fixed-wing propulsion system and a multirotor propulsion system. The multirotor propulsion system may include a propeller coupled to a motor shaft. A motor may drive the propeller via the motor shaft. The hybrid aircraft may include a magnetic orientation detent to hold the propeller of the multirotor propulsion system when power to the multirotor propulsion system is removed. The magnetic orientation detent may include a plurality of magnets coupled to the circumference of the motor shaft and a detent magnet magnetically coupled to the plurality of magnets.

In an example embodiment, a method for applying a magnetic orientation detent includes elevating a hybrid aircraft using a multirotor propulsion system of the hybrid aircraft. The multirotor propulsion system includes a plurality of propellers. The method may also include accelerating the hybrid aircraft using the multirotor propulsion system. The method may then remove power from the multirotor propulsion system and fly using a fixed-wing propulsion system. The method may then apply a magnetic orientation detent to the plurality of propellers. The magnetic orientation detent may include one or more magnets coupled to a motor shaft of a motor, the motor driving at least one of the plurality of propellers and a detent magnet magnetically coupled to the one or more magnets. The detent magnet may hold the at least one propeller of the multirotor propulsion system when power is removed from the multirotor propulsion system.

Technical advantages of certain embodiments may include increasing the aerodynamic attributes of a hybrid aircraft by reducing drag. Holding the propellers of the multirotor system in line with the airflow of the hybrid aircraft may prevent the propellers from freely spinning during flight, which can cause excess wear on the motor bearings and generate excessive noise. Another advantage provided by the magnetic orientation detent may include extending the flight-time capabilities of the hybrid aircraft by minimizing the power consumption of the multirotor propulsion system when flying with the fixed-wing propulsion system. Another advantage provided by a magnetic orientation is that it may reduce the number of mechanical and electrical components of the hybrid aircraft, thereby decreasing the number of components that may be subject to failure.

Other technical advantages will be readily apparent to one skilled in the art from FIGS. 1-4, descriptions, and claims. Moreover, while specific advantages have been enumerated above, various embodiments may include all, some, or none of the enumerated advantages.

DETAILED DESCRIPTION OF EXAMPLE EMBODIMENTS

To facilitate a better understanding of the present disclosure, the following examples of certain embodiments are given. The following examples are not to be read to limit or define the scope of the disclosure. Embodiments of the present disclosure and its advantages are best understood by referring to FIGS. 1 through 4, where like numbers are used to indicate like and corresponding parts.

Fixed-wing aircraft perform a number of commercial, military, and civilian tasks. Once airborne, fixed-wing aircraft are power efficient and effective at cruising for long distances. Yet, fixed-wing aircraft typically require sufficient runway space for takeoff and landing. Recently, hybrid aircraft have incorporated a multirotor system with the fixed-wing aircraft. The multirotor system allows the hybrid aircraft to take off and land vertically, while the fixed-wing system is used for flying once airborne. However, the multirotor system may interfere with the flying capabilities of the fixed-wing aircraft.

For example, a hybrid aircraft may utilize a multirotor propulsion system to vertically launch and accelerate to a cruising speed. Once the hybrid aircraft reaches a sufficient airspeed for flight using a more efficient fixed-wing propulsion system, the hybrid aircraft may switch power from the multirotor propulsion system to the fixed-wing propulsion system. Once the hybrid aircraft is flying with the fixed-wing system, power to the multirotor system may be removed. However, once power is removed, the propellers from the multirotor system may windmill and spin freely while the hybrid aircraft is flying. This extraneous movement by the propellers may increase drag on the hybrid aircraft, impeding the efficiency and flying performance of the hybrid aircraft. Furthermore, the free spinning propellers may cause excess wear on the motor bearings used to drive the propellers, reducing the life of the multirotor system.

Several techniques have attempted to overcome the issues presented by the free spinning propellers of the multirotor system. For example, some hybrid devices apply power to the multirotor system to keep the propellers in a locked position. However, this approach may drain battery power, thus reducing the available flight time of the hybrid aircraft. Furthermore, the motors may need additional components, such as an encoder, to monitor the position of the motor shaft. This increases the complexity and cost of the hybrid aircraft.

To utilize the benefits of the multirotor system without interfering with the fixed-wing system, embodiments of the disclosure may include a magnetic orientation detent to hold the propellers of the multirotor system in place when the propellers are not being utilized. To apply a magnetic orientation detent according to embodiments of the disclosure, a plurality of magnets may be coupled to the shaft of the motor driving a propeller of the multirotor system. Furthermore, a detent magnet may be positioned perpendicularly to the motor shaft. When power is removed from the multirotor system, the magnetic forces between the detent magnet and the magnets coupled to the motor shaft attract to hold the motor shaft in place. By properly selecting the polarity, positioning, and strength of the magnets, the propeller may be oriented and held in line with the flight of the hybrid aircraft. When power is re-applied to the multirotor system, the force from the motor may overcome the magnetic detent and drive the propellers.

Applying a magnetic orientation detent to the propellers of the multirotor system provides a number of technical advantages not realized by current systems. Certain embodiments may increase the aerodynamic attributes of a hybrid aircraft by reducing drag. Holding the propellers of the multirotor system in line with the airflow of the hybrid aircraft may prevent the propellers from freely spinning during flight, which can cause excess wear on the motor bearings and generate excessive noise. Another advantage provided by the magnetic orientation detent may include extending the flight-time capabilities of the hybrid aircraft by minimizing the power consumption of the multirotor propulsion system when flying with the fixed-wing propulsion system. Another advantage provided by a magnetic orientation detent may be that it reduces the number of mechanical and electrical components of the hybrid aircraft thereby decreasing the number of components that may be subject to failure. FIGS. 1-4 provide additional details of the magnetic orientation detent that may provide these and other advantages.

Figure 1:
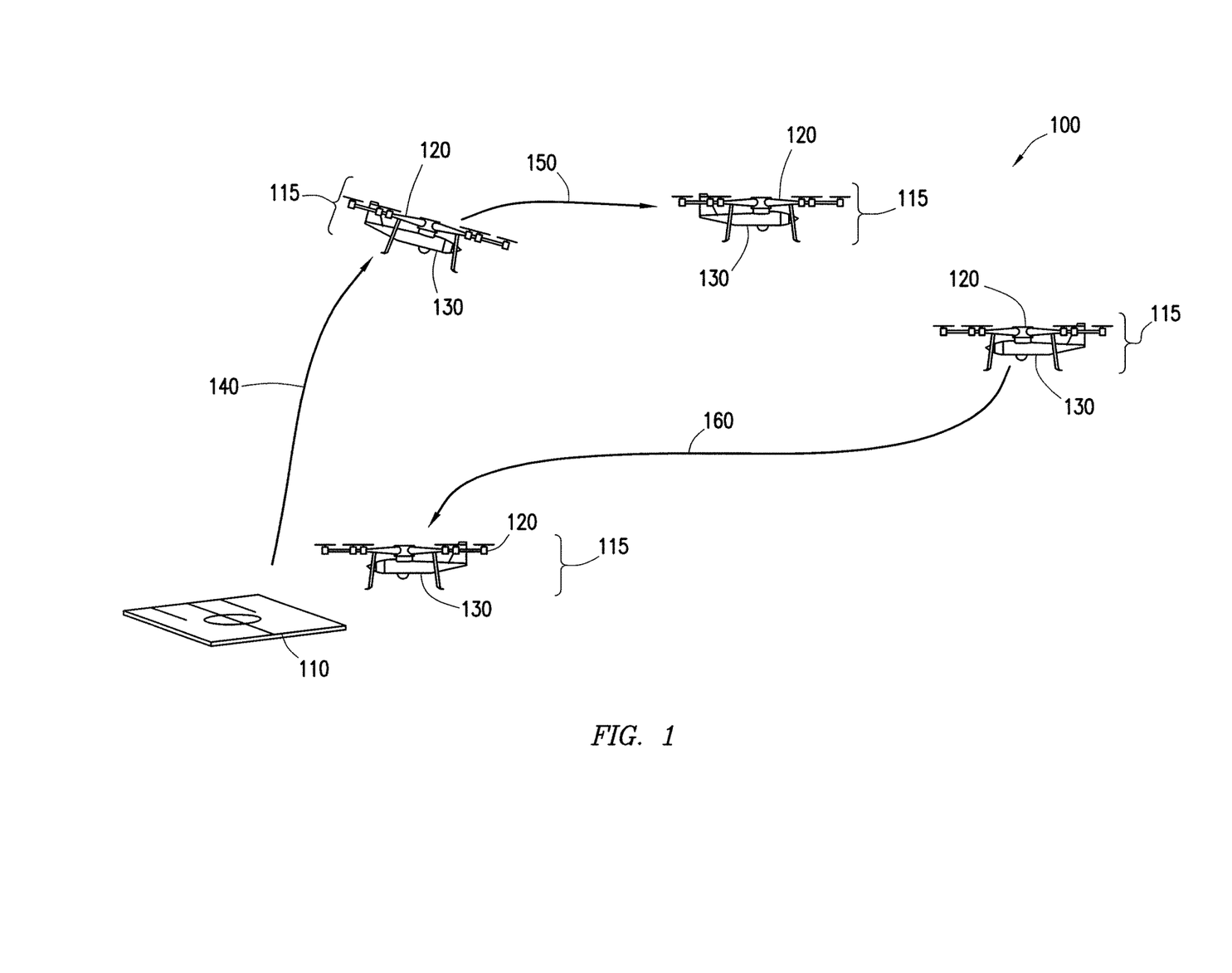
FIG. 1 illustrates an example system of a hybrid aircraft launching and landing, according to certain embodiments.

FIG. 1 illustrates an example system 100 of a hybrid aircraft 115 launching and landing according to certain embodiments. In the illustrated embodiment, hybrid aircraft 115 comprises a multirotor system 120 and a fixed-wing system 130. Hybrid aircraft 115 may take-off and land from a launch site 110.

Launch site 110 represents any suitable location that allows hybrid aircraft 115 to takeoff and/or land. In some embodiments, launch site 110 may represent an area that cannot accommodate a runway. For example, launch site 110 may be a helipad on a ship, a rooftop of a building, uneven terrain, a heavily populated event, or any other location not suitable for aircraft that require runway space.

To take off from launch site 110, hybrid aircraft 115 powers multirotor system 120 to vertically lift and elevate hybrid aircraft 115 along a launch path 140. A number of factors may determine the elevation and direction of launch path 140. These factors may include the flight path and mission of hybrid aircraft 115, the surrounding environmental conditions (e.g., nearby buildings, fences, etc.), regulations (e.g., Federal Aviation Regulations or local ordinances), wind and weather patterns, and design limitations of hybrid aircraft 115 (e.g., battery capacity, wingspan, etc.). Launch path 140 may also vary based on the capabilities of multirotor system 120 such as the rate of elevation and lifting capacity.

In an example embodiment, hybrid aircraft 115 may takeoff vertically from launch site 110 using multirotor system 120. Hybrid aircraft 115 may climb to a release altitude of 1000 feet at a rate of 500 feet-per-minute (fpm). At the rate of elevation, this may take hybrid aircraft 115 approximately two minutes. The elevation and climbing rate of hybrid aircraft 115 may depend on the application and technical specifications of hybrid aircraft 115.

In some embodiments, upon reaching the desired altitude, hybrid aircraft 115 may transition to a forward direction according to a flight path 150. In some embodiments, multirotor system 120 may elevate at an angle during launch path 140 in the direction of flight path 150. Multirotor system 120 may continue accelerating along flight path 150 until reaching a sufficient speed to switch over to fixed-wing system 130.

Depending on the size and abilities of fixed-wing system 130, multirotor system 120 may accelerate to any suitable speed that allows fixed-wing system 130 to maintain flight after power to multirotor system 120 is reduced or shut off. For example, hybrid aircraft 115 may be utilized to dispense pesticides as an agricultural crop duster. When crop dusting, hybrid aircraft 115 may fly at 30-40 km/h. Thus, hybrid aircraft 115 may accelerate up to 30-40 km/h using multirotor system 120 and then switch power to fixed-wing system 130 to perform the crop dusting.

As another example, hybrid aircraft 115 may be used for reconnaissance missions and need to cover long distances at a higher cruising speed. Hybrid aircraft 115 may utilize multirotor system 120 to take-off and accelerate up to minimum airspeed sufficient for fixed-wing system 130 to operate independently. Upon reaching a sufficient airspeed, hybrid aircraft 115 may switch power over to fixed-wing system 130.

In some embodiments, hybrid aircraft 115 may utilize both multirotor system 120 and fixed-wing system 130 to enhance the acceleration of hybrid aircraft 115. This may decrease the time needed to accelerate to the desired switchover speed and may ensure that fixed-wing system 130 is operating at sufficient speeds to maintain flight once power to multirotor system 120 is removed.

In this manner, hybrid aircraft 115 may takeoff vertically and accelerate using multirotor system 120. Hybrid aircraft 115 may then switch over to fixed-wing system 130 to conserve power and increase flying efficiency.

Figure 2:
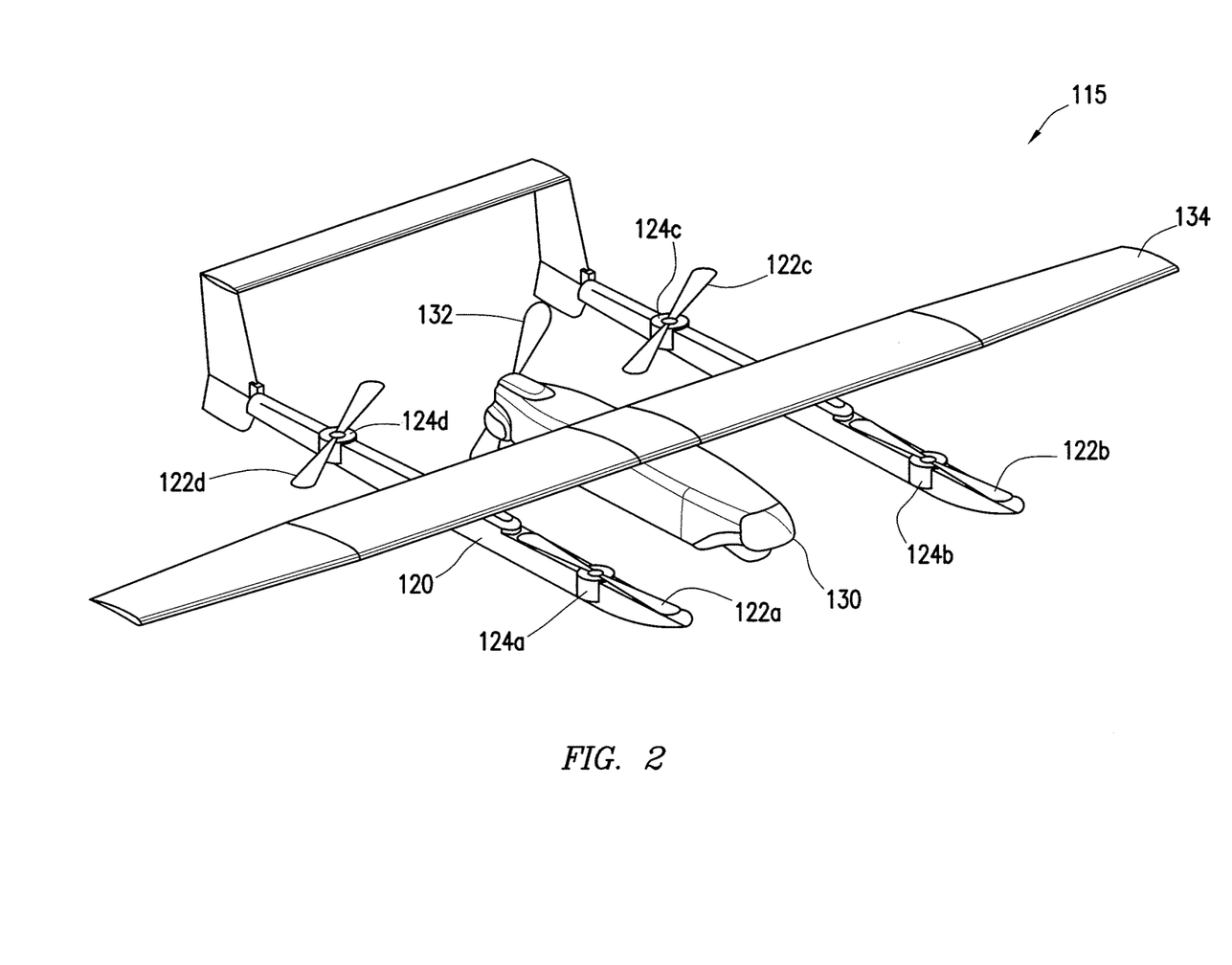
FIG. 2 illustrates an example hybrid aircraft, according to certain embodiments.
Figure 3A:
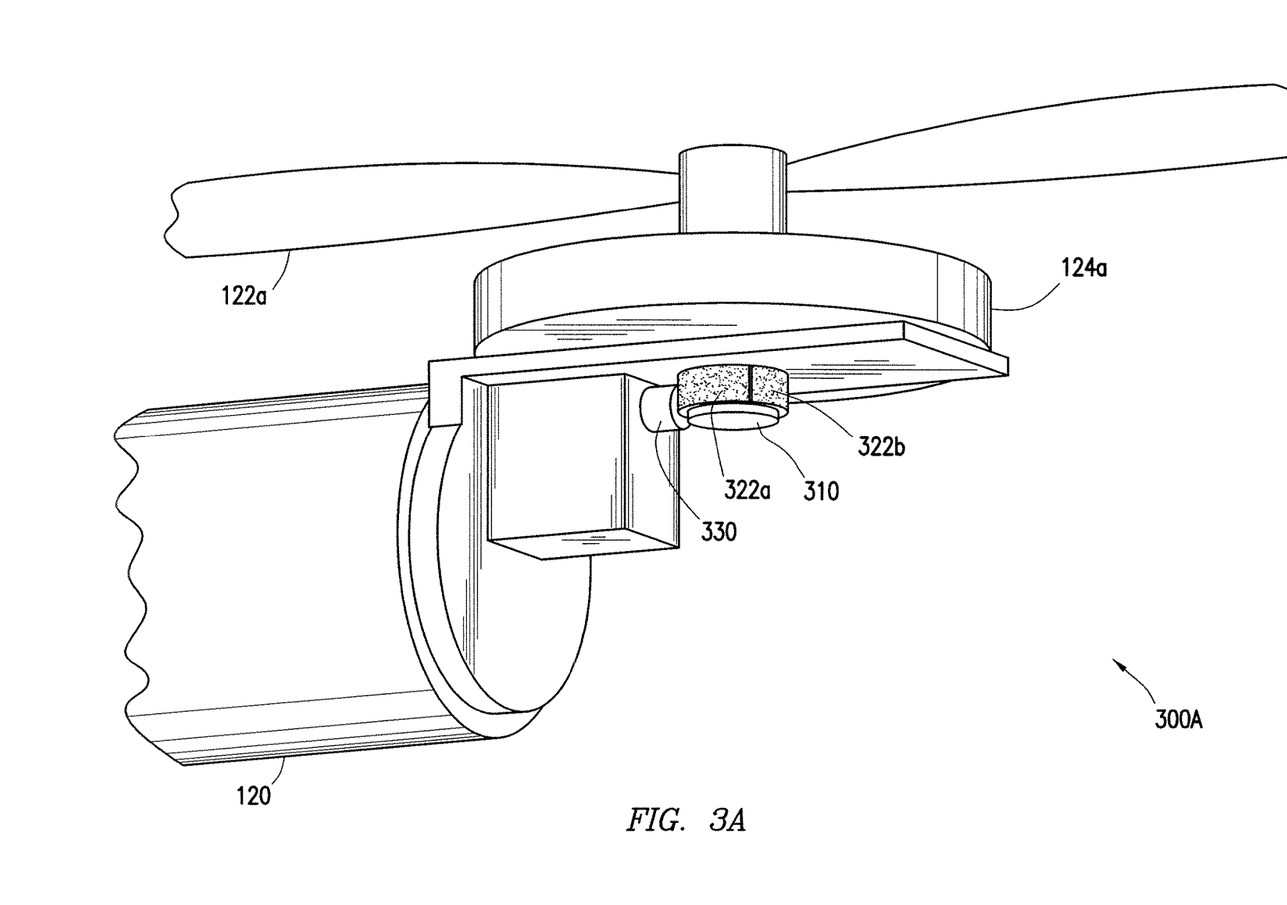
FIG. 3A illustrates a close-up view of an example magnetic orientation detent used to hold propellers of a multirotor system, according to certain embodiments.
Figure 3B:
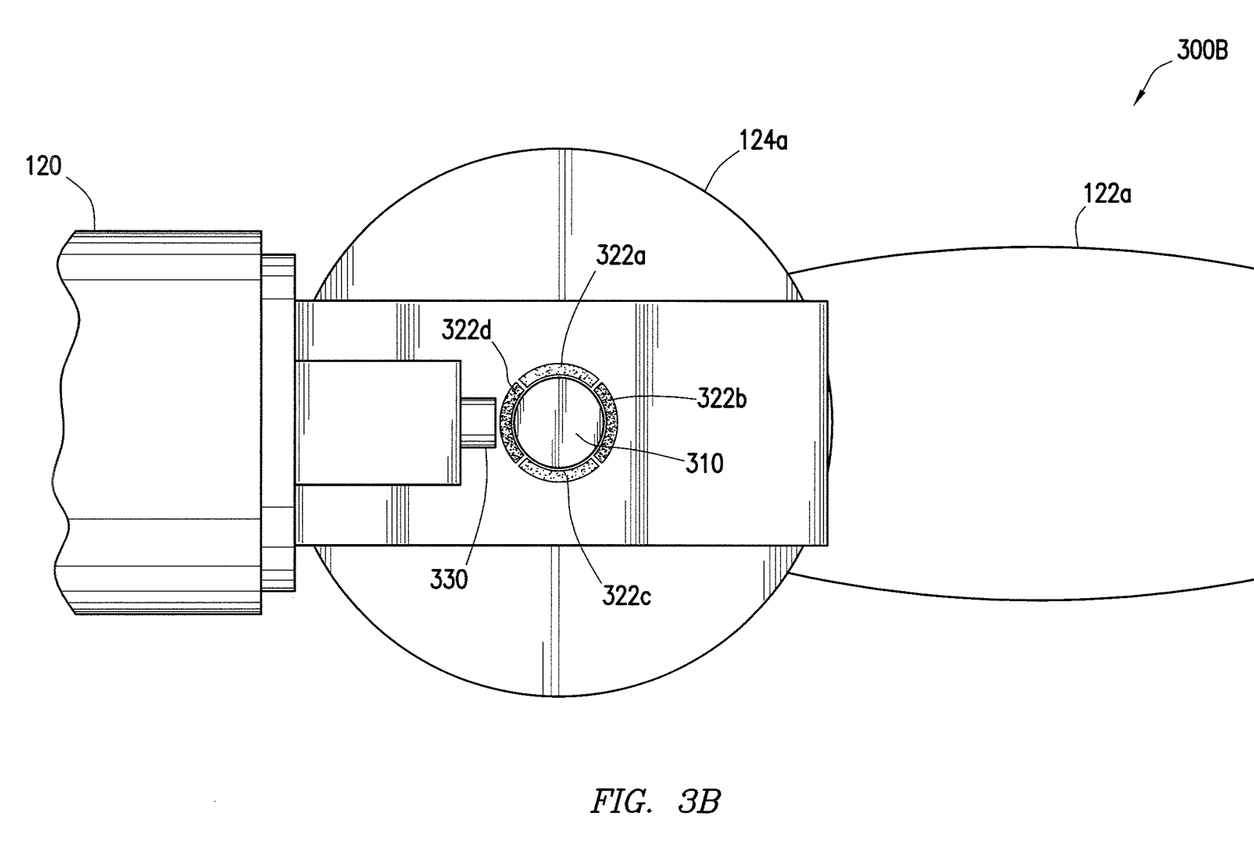
FIG. 3B illustrates an underneath view of an example magnetic orientation detent for propellers of a multirotor system, according to certain embodiments.

As shown in detail in FIGS. 2 and 3, once power to multirotor system 120 is shutoff and hybrid aircraft 115 is flying using fixed-wing system 130, the propellers of multirotor system 120 (e.g., propellers 122) may begin spinning freely. This may increase the drag on hybrid aircraft 115, thereby reducing the flying efficiency of fixed-wing system 130. Furthermore, the free spinning propellers may cause excess wear on the motor bearings of the propellers, as well as generate noise.

To overcome these issues, the propellers of multirotor system 120 may be held in line with the direction hybrid aircraft 115 is flying. In some embodiments, the propellers of multirotor system 120 are held in place using a magnetic orientation detent attached to the motor shaft of the propellers. Accordingly, the propellers of multirotor system 120 may be held in place while hybrid aircraft 115 is flown using fixed-wing system 130.

Once hybrid aircraft 115 has finished flying using fixed-wing system 130, hybrid aircraft 115 may return to launch site 110 along a return path 160. While flying back to launch site 110, hybrid aircraft 115 may begin to decelerate so that hybrid aircraft 115 may land vertically at launch site 110. For example, hybrid aircraft 115 may reduce power to fixed-wing system 130 so that hybrid aircraft 115 decreases airspeed. Hybrid aircraft 115 may increase power to multirotor system 120 while decreasing power to fixed-wing system 130 until multirotor system 120 is the primary propulsion system. The power provided to multirotor system 120 may be sufficient to overcome the magnetic orientation detent holding propellers 120 in place. In some embodiments, multirotor system 120 may bring hybrid aircraft 115 to a hover and vertically descend onto launch site 110.

In some embodiments, hybrid aircraft 115 may utilize the propulsion systems of both multirotor system 120 and fixed-wing system 130 to aid in the deceleration process. In this manner, multirotor system 120 and fixed-wing system 130 may both return to launch site 110 in a controlled and safe manner.

Modifications, additions, or omissions may be made to system 100 without departing from the scope of the disclosure. In some embodiments, hybrid aircraft 115 may be controlled by a pilot in a remotely located control area. In some embodiments, hybrid aircraft 115 may operate autonomously to take off along launch path 140 and land according to return path 160. For example, hybrid aircraft 115 may follow a preprogrammed launch path 140 and climb to a specific elevation at a specific rate of speed. Hybrid aircraft 115 may then switch to using fixed-wing system 130.

As another example, to maximize the locations where hybrid aircraft 115 may operate, in certain embodiments, hybrid aircraft 115 may include landing gear to utilize runways when available and rely on multirotor system 120 if runways are unavailable. This may be beneficial if hybrid aircraft 115 is launching from a first location having sufficient area for a runway but traveling to a second location that cannot support a runway (or vice versa). Thus, the second location may still rely on and utilize hybrid aircraft 115 based on the vertical landing capabilities of multirotor system 120.

FIG. 2 illustrates an example hybrid aircraft 115 according to certain embodiments. In the illustrated embodiment, hybrid aircraft 115 comprises multirotor system 120 and fixed-wing system 130.

Multirotor system 120 represents any suitable device capable of assisting in the takeoff and landing of hybrid aircraft 115. In the illustrated embodiment, multirotor system 120 includes four propellers 122*a-d* (collectively "propellers 122") driven by motors 124*a-d* (collectively "motors 124").

Motors 124 represent any suitable motor for driving propellers 122 of multirotor system 120. The size and capability of motors 124 (e.g., power, thrust, rpm, etc.) may depend on the applications of hybrid aircraft 115. Similarly, the power and thrust capabilities of motors 124 may depend on additional factors such as the weight of hybrid aircraft 115, the length and pitch of propellers 122, the desired efficiency of motors 124, any payloads attached to hybrid aircraft 115, and the desired takeoff capabilities (e.g., climb rates) of hybrid aircraft 115. In some embodiments, motors 124 may be brushless DC motors.

Hybrid aircraft 115 may power motors 124 to drive propellers 122 to vertically launch and land hybrid aircraft 115. Furthermore, by varying the power to each individual motor 124, hybrid aircraft 115 may control the direction, speed, pitch, and yaw of hybrid aircraft 115.

In the illustrated embodiment, fixed-wing system 130 includes a fixed-wing propeller 132 and a wing 134. Fixed-wing propeller 132 may be used to propel hybrid aircraft 115. In the illustrated embodiment, fixed-wing propeller 132 is positioned at the rear of hybrid aircraft 115. However, fixed-wing propeller 132 may be positioned at any suitable location, such as on the nose of hybrid aircraft 115. Wing 134 may vary in size and shape depending on the size, weight, and lift needed to fly hybrid aircraft 115.

FIG. 2 also illustrates the proper and improper positioning of propellers 122 when utilizing the magnetic orientation detent according to embodiments of the present disclosure. As described above, once hybrid aircraft 115 has reached sufficient airspeed using multirotor system 120, power may be switched to fixed-wing system 130. The magnetic orientation detent may then hold propellers 122 in-line with the direction hybrid aircraft 115 is flying. In the illustrated embodiment, propellers 122*a* and 122*b* are properly aligned for streamlined flying. Propellers 122*a* and 122*b* are positioned in-line with the forward direction of hybrid aircraft 115. The positioning of propellers 122*a* and 122*b* help streamline hybrid aircraft 115 as it flies utilizing fixed-wing system 130.

In contrast, propellers 122*c* and 122*d* illustrate improperly aligned propellers or propellers that are allowed to freely spin once power has been removed from multirotor system 120. By not aligning with the direction of flight, propellers 122*c* and 122*d* cause excess drag on hybrid aircraft 115. Furthermore, the motors of propellers 122*c* and 122*d* may wear out the bearings of motor 124*c* and 124*d* as propellers 122*c* and 122*d* freely spin. This may reduce the useful lifespan of hybrid aircraft 115.

Modifications, additions, or omissions may be made to hybrid aircraft 115 without departing from the scope of the disclosure. For example, the illustrated embodiment shows multirotor system 120 with four propellers 122*a-d*. However, multirotor system 120 may have any suitable number of propellers 122. Furthermore, in some embodiments, instead of having single propellers 122, multirotor system 120 may include clusters of propellers 122. For example, multirotor system 120 may comprise propeller clusters that have a variable-pitch to control the vertical acceleration and climb rates. In some embodiments, propeller clusters may be fixed-pitch blades that may each be independently controlled to control flight speed and direction. Similarly, although the illustrated embodiment shows fixed-wing system 130 comprising fixed-wing propeller 132, the propulsion mechanism of fixed-wing system 130 may utilize any suitable propulsion mechanism, such as jet engines.

Furthermore, in some embodiments, hybrid aircraft 115 may include landing supports that allow hybrid aircraft 115 to land and/or takeoff from launch site 110 without requiring landing gear. For example, landing supports may be sufficiently long in length to support both multirotor system 120 and fixed-wing system 130 when stationary on launch site 110.

To provide a better understanding of the magnetic orientation detent of hybrid aircraft 115, FIGS. 3A and 3B illustrate a close-up view of the propulsion system of multirotor system 120 according to certain embodiments.

FIG. 3A illustrates a close-up view 300A of an example magnetic orientation detent used to hold propellers 122 of multirotor system 120 according to certain embodiments. In the illustrated embodiment, propeller 122*a* is driven by motor 124*a* via a motor shaft 310. To apply the magnetic orientation detent to propeller 122*a*, motor shaft 310 may extend below motor 124*a* and couple to one or more magnets 322. Detent magnet 330 may be aligned perpendicular to motor shaft 310 and magnets 322. In this manner, motor 124a may drive propeller 122a when powered by hybrid aircraft 115. However, when power is removed from motor 124a, the magnetic attraction between detent magnet 330 and magnets 322 may hold motor shaft 310 in place, thereby preventing propeller 122a from freely spinning.

Magnets 322 and detent magnet 330 represent any suitable magnets that are capable of providing a magnetic orientation detent to propeller 122a. Furthermore, magnets 322 and detent magnet 330 may be any suitable shape, size, strength, and material. Factors that influence the design of magnets 322 and detent magnet 330 may include the operational temperature range required by the magnetic orientation detent, the required oxidation resistivity, susceptibility to demagnetization, mechanical strength, and magnetic field strength.

Magnets 322 and detent magnet 330 may be made of any suitable material. As an example, and not by way of limitation, magnets 322 and detent magnet 330 may be comprised of neodymium iron boron (NdFeB), samarium cobalt (SmCo), alnico, and/or ceramic or ferrite magnets.

The polarity and/or magnetic orientation of magnets 322 may be selected in any suitable fashion that allows magnets 322 to magnetically couple with detent magnet 330 to hold propellers 122 in place when power to multirotor system 120 is removed. For instance, magnets 322 may be shaped as arc magnets 322. The polarity of arc magnets may be radially oriented such that the outward facing side is a first polarity (e.g., North) and the inward facing side (i.e., the side facing motor shaft 310) is the opposite polarity (e.g., South).

To better understand the relationship between motor shaft 310, magnets 322, and detent magnet 330, FIG. 3B illustrates an underneath view 300B of an example magnetic orientation detent for propeller 122a of multirotor system 120 according to certain embodiments. In the illustrated embodiment, magnets 322a-d are represented as arc magnets that conform to the circumference of motor shaft 310. Although illustrated as having four magnets 322 coupled to motor shaft 310, any suitable number of magnets 322 may be coupled to motor shaft 310.

In some embodiments, detent magnet 330 may be fixed to hybrid aircraft 115 and positioned perpendicularly to motor shaft 310 and magnets 322. In the illustrated embodiment, detent magnet 330 is represented as a cube shaped magnet. However, detent magnet 330 may be any suitable shaped magnet. For instance, detent magnet 330 may be the same shape as magnet 322 and have the same or varying magnetic properties.

In some embodiments, magnets 322 may be designed to have a radial magnetic polarity. For example, the outward facing magnetic polarity of magnets 322 may be selected so that magnets 322b and 322d have an outward facing South polarity, while magnets 322a and 322c have an outward facing North polarity. In this manner, the outward facing magnetic field created by magnets 322 may alternate North-South-North-South. By alternating the polarity of magnets 322, detent magnet 330 may repel magnets of the same polarity and attract magnets of the opposite polarity.

To ensure that propeller 122a is positioned in line with the flying direction of hybrid aircraft 115, magnets 322 may be attached to motor shaft 310 so that the alignment of detent magnet 330 with magnet 322d or 322b holds motor shaft 310, and thus propeller 122a, in line with the direction of flight. For example, as illustrated, detent magnet 330 will attract to magnets 322b and 322d, and repel magnets 322a and 322c. Propeller 122a may be attached to motor shaft 310 such that propeller 122a are in line with the flight direction of hybrid aircraft 115 when magnet 322b or 322d is magnetically coupled with detent magnet 330.

For example, if propeller 122a comes to a stop with magnet 322a facing detent magnet 330, detent magnet 330 may repel magnet 322a causing motor shaft 310 to rotate around until magnet 322b or 322d faces detent magnet 330. Because detent magnet 330 and magnet 322d have opposite magnetic polarities they will attract causing motor shaft 310 to hold in place. This arrangement of magnets 322 may ensure that motor shaft 310, and thus propeller 122a, are positioned such that propeller 122a is in line with the flight direction of hybrid aircraft 115.

The magnetic orientation detent created by detent magnet 330 and magnets 322 should be sufficiently strong to hold propellers 122 in place during flight. The holding power of magnetic orientation detent may depend on a number of factors including the distance between detent magnet 330 and magnets 322, the magnetic field strength generated by detent magnet 330 and magnets 322, and the shape of magnets 322 and detent magnet 330.

To illustrate the application of magnetic orientation detent, an example embodiment is provided. In one example, detent magnet 330 may have a North magnetic polarity perpendicular to magnets 322. Magnets 322a and 322c may also have outward facing North magnetic polarities. Magnets 322b and 322d may have outward facing South magnetic polarities.

Hybrid aircraft 115 may power multirotor system 120 to vertically takeoff from launch site 110. After reaching sufficient airspeed, hybrid aircraft 115 may switch power from multirotor system 120 to fixed-wing system 130. Once power is removed from motor 124a, the rotation of motor shaft 310 will begin to slow. As motor shaft 310 stops rotating, detent magnet 330 will repel magnets 322a and 322c and attract magnets 322b and 322d. By properly positioning magnets 322b and 322d, motor shaft 310 will be held in place using detent magnet 330 and magnet 322b/d. When hybrid aircraft 115 increases power to motor 124a, motor shaft 310 may begin rotating and overcome the magnetic orientation detent created by detent magnet 330 and magnet 322b/d.

Modifications, additions, or omissions may be made to hybrid aircraft 115 without departing from the scope of the disclosure. For example, although FIGS. 3A and 3B are illustrated using propeller 122a and motor 124a, each propeller 122 in multirotor system 120 may incorporate the illustrated magnetic orientation detent. Furthermore, in some embodiments, more than one detent magnet 330 may be used to hold propellers 122 in place. For example, an additional detent magnet, having a magnetic polarity opposite of detent magnet 330, may be added perpendicular to magnet 322a to increase the holding capabilities of the magnetic orientation detent. Although magnetic orientation detent is applied beneath motors 124 in the illustrated embodiment, the magnetic orientation detent may be applied in any suitable location, for example, in between motor 124a and propeller 122a.

Figure 4:
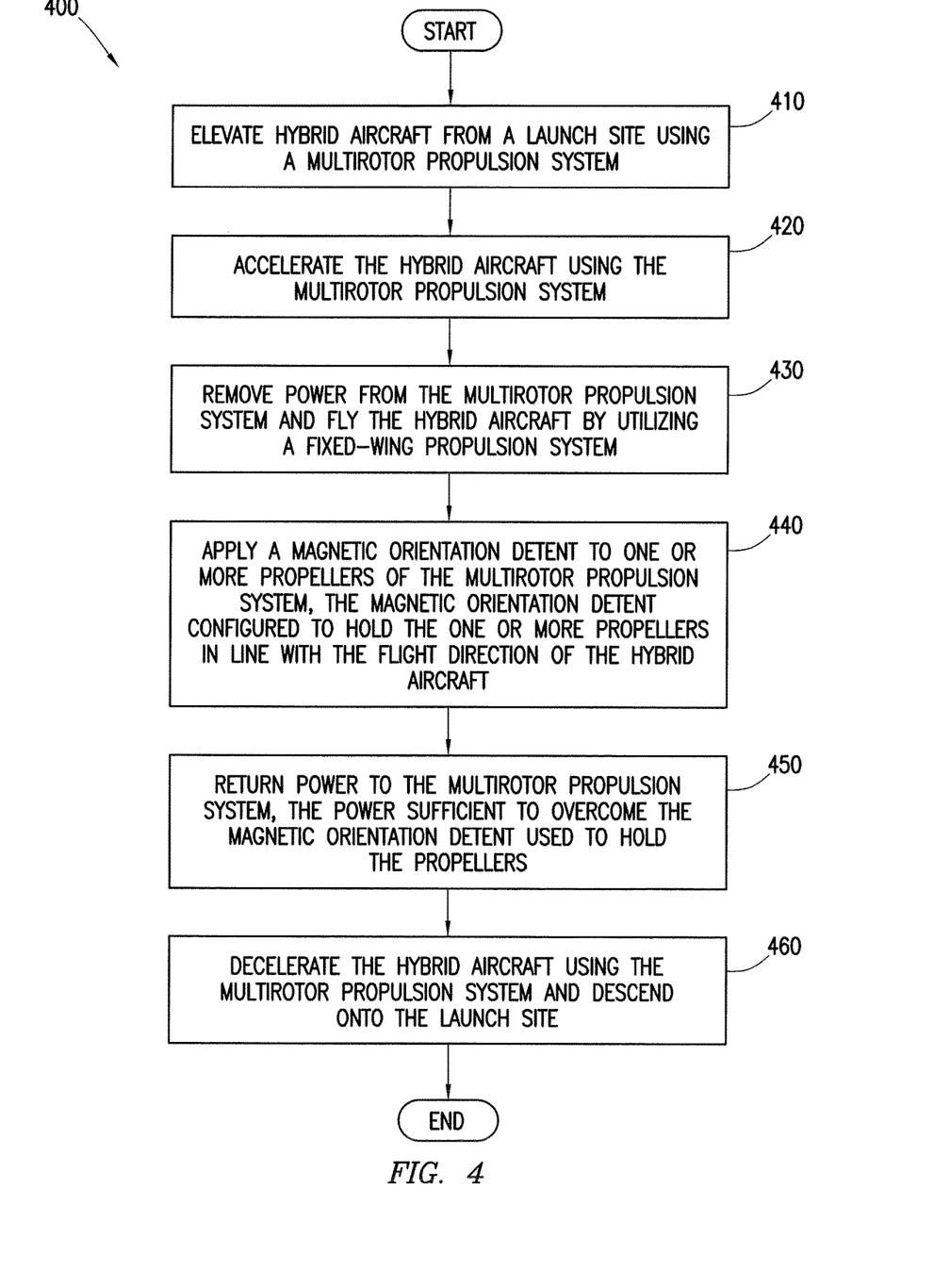
FIG. 4 illustrates an example method for operating a hybrid aircraft having a magnetic orientation detent, according to certain embodiments.

FIG. 4 illustrates an example method 400 for operating hybrid aircraft 115, having a magnetic orientation detent according to certain embodiments. At step 410, hybrid aircraft 115 may takeoff from launch site 110 using multirotor system 120. Multirotor system 120 may elevate hybrid aircraft 115 from launch site 110 vertically using one or more propellers 122. Multirotor system 120 may elevate hybrid aircraft 115 to a desired elevation and airspeed. For example, in some embodiments, multirotor system 120 initiates the elevation process upon receiving a launch signal from an operator stationed at a location separate from launch site 110. Upon receiving the launch signal, multirotor system 120 may follow launch path 140 up to a desired elevation.

At step 420, multirotor system 120 may accelerate hybrid aircraft 115 up to a sufficient airspeed to allow fixed-wing system 130 to take over flight of hybrid aircraft 115. The airspeed needed before switching over to fixed-wing system 130 may depend on a number of factors including the weight of hybrid aircraft 115, the altitude, and the vertical and lateral acceleration of hybrid aircraft 115. In some embodiments, the minimum airspeed needed by hybrid aircraft 115 before switching from multirotor system 120 to fixed-wing system 130 may at least be the stall speed of hybrid aircraft 115. In certain embodiments, fixed-wing system 130 may utilize its own propulsion system to assist multirotor system 120 in the acceleration process before power is removed from multirotor system 120.

At step 430, hybrid aircraft 115 may remove power from multirotor system 120 and utilize fixed-wing system 130. Once power is removed from multirotor system 120, at step 440, the magnetic orientation detent created by detent magnet 330 and magnets 322 may hold propellers 122 in line with the flight direction of hybrid aircraft 115. For example, as power is removed from motor 124a, motor shaft 310 slows its rotation. As motor shaft 310 comes to a stop, detent magnet 330 may repel magnets 322 having the same polarity while attracting magnets 322 having the opposite polarity. In this manner, motor shaft 310 will stop rotating and be held in place by the magnetic detent created by detent magnet 330 and magnets 322. By selecting the proper orientation and positioning of magnets 322, the position of motor shaft 310 may align propellers 122 in line with the direction hybrid aircraft 115 is flying.

At step 450, hybrid aircraft 115 may return power to multirotor system 120. The power applied to motors 124 may be sufficient to overcome the magnetic orientation detent created by detent magnet 330 and magnets 322 and drive propellers 122. In some embodiments, hybrid aircraft 115 may return power to multirotor system 120 upon approaching launch site 110 to vertically land hybrid aircraft 115. For example, while returning to launch site 110, hybrid aircraft 115 may increase the power to multirotor system 120 so that both fixed-wing system 130 and multirotor system 120 are utilized in flying hybrid aircraft 115.

At step 460, hybrid aircraft 115 may decelerate until hybrid aircraft 115 is just utilizing multirotor system 120. In some embodiments, hybrid aircraft 115 may decelerate to a hover and descend to launch site 110. In this manner, hybrid aircraft 115 may utilize the flying efficiency created by fixed-wing system 130 even when launch site 110 does not have sufficient room for a runway.

Various embodiments may perform some, all, or none of the steps described above. Furthermore, certain embodiments may perform these steps in a different order or in parallel. Moreover, one or more steps may be repeated. Any suitable component may perform one or more steps of the method.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein.

Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend.

Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A hybrid aircraft, comprising:
    a fixed-wing propulsion system; and
    a multirotor propulsion system, the multirotor propulsion system comprising:
        a structure;
        a propeller coupled to a motor shaft; and
        a motor operable to drive the propeller using the motor shaft;
        a plurality of magnets of alternating polarity coupled to and around a circumference of the motor shaft outside of the motor and on a side of the motor opposite the propeller, and that are strategically arranged so that magnets disposed at the same azimuth as blades of the propeller have the same polarity; and
        a detent magnet mounted to the structure and spaced radially from the motor shaft and the plurality of magnets, the detent magnet being responsive to the plurality of magnets, and polarized opposite that of the magnets disposed at the same azimuth as blades of the propeller, so that when motor operation is suspended, a magnetic attraction between the detent magnet and the magnets disposed at the same azimuth as blades of the propeller align the detent magnet with the magnets disposed at the same azimuth as blades of the propeller and the blades of the propeller.

2. The hybrid aircraft of claim 1, wherein: the plurality of magnets coupled to the motor shaft comprise four arc magnets having alternating magnetic polarities; and the detent magnet is positioned perpendicularly to the plurality of magnets coupled to the motor shaft.

3. The hybrid aircraft of claim 1, wherein the plurality of magnets coupled to the motor shaft comprise arc magnets having radially oriented magnetic polarities, wherein the polarity of each magnet proximate the motor shaft is opposite the polarity distal the motor shaft.

4. The hybrid aircraft of claim 1, wherein the detent magnet comprises a first magnetic polarity and at least one of the plurality of magnets coupled to the motor shaft comprises a second magnetic polarity, wherein the second magnetic polarity is opposite that of the first magnetic polarity.

5. The hybrid aircraft of claim 1, wherein the detent magnet and at least one of the plurality of magnets coupled to the motor shaft have a same magnetic polarity.

6. The hybrid aircraft of claim 1, wherein the detent magnet and the plurality of magnets are comprised of Neodymium-Iron-Boron.

7. A method for applying a magnetic orientation detent, the method comprising:
    elevating a hybrid aircraft using a multirotor propulsion system, the multirotor propulsion system comprising motors, motor shafts that each are selectively rotated by a one of the motors, and a plurality of propellers, each propeller mounted on a portion of a one of the motor shafts;

accelerating the hybrid aircraft to a first airspeed using the multirotor propulsion system;

removing power from the multirotor propulsion system;

flying the hybrid aircraft using a fixed-wing propulsion system;

and preventing the plurality of propellers from rotating using a magnetic orientation detent, the magnetic orientation detent comprising:

one or more magnets coupled to a portion of each of the motor shafts outside of each of the motors, and on a side of each of the motors opposite from the attached propellers;

a detent magnet spaced radially away from each of the one or more magnets, that is magnetically coupled to the one or more magnets, and having an opposite polarity than that of magnets of the one or more magnets that are azimuthally aligned with blades of the propeller, so that when operation of the motor is suspended, a magnetic attraction between each detent magnet and magnets having opposite polarity aligns blades of the propeller with the detent.

8. The method of claim 7, further comprising: applying power to the multirotor propulsion system, wherein in response to applying power to the multirotor propulsion system, the one or more propellers are configured to overcome the magnetic orientation detent;

decelerating the hybrid aircraft to a hover using the multirotor propulsion system; and descending the hybrid aircraft to the launch site using the multirotor propulsion system.

9. The method of claim 7, wherein using the magnetic orientation detent to prevent the plurality of propellers from rotating comprises holding the plurality of propellers in line with a flight direction of the hybrid aircraft.

10. The method of claim 7, wherein the plurality of magnets are comprised of Neodymium-Iron-Boron.

11. The method of claim 7, wherein the detent magnet is positioned perpendicularly to the one or more magnets coupled to the motor shaft.

12. The method of claim 7, wherein the detent magnet and at least one of the one or more magnets coupled to the motor shaft have a same magnetic polarity.

13. The method of claim 7, wherein the detent magnet and at least one of the one or more magnets coupled to the motor shaft have opposite magnetic polarities.

14. A magnetic orientation detent for use with a hybrid aircraft, comprising:

a plurality of magnets coupled to a portion of a motor shaft distal from a portion on which a propeller is mounted, the motor shaft being selectively rotated by a motor that is disposed between the plurality of magnets and the propeller, the plurality of magnets spaced away from and outside of the motor and arranged around the motor shaft, so that magnets having the same polarity are at substantially the same azimuth as blades of the propeller; and a detent magnet spaced radially from the plurality of magnets and on a structure of the hybrid aircraft, the detent magnet magnetically coupled to the plurality of magnets and having a polarity opposite that of the magnets at substantially the same azimuth as blades of the propeller, the detent magnet configured to prevent the propeller from rotating when power is removed from the motor.

15. The magnetic orientation detent of claim 14, wherein the plurality or magnets coupled to the motor shaft comprise four arc magnets surrounding a circumference of the motor shaft, the four arc magnets comprising radially oriented magnet polarities that alternate in polarity.

16. The magnetic orientation detent of claim 14, wherein the detent magnet comprising a first magnetic polarity and at least one of the plurality of magnets coupled to the motor shaft comprises a second magnetic polarity, wherein the second magnetic polarity is opposite that of the first magnetic polarity.

17. The magnetic orientation detent of claim 14, wherein the detent magnet and at least one of the plurality of magnets coupled to the motor shaft have a same magnetic polarity.

18. The magnetic orientation detent of claim 14, wherein the plurality of magnets are comprised of Neodymium-Iron-Boron.

19. The magnetic orientation detent of claim 14, wherein a terminal end of the motor shaft proximate the plurality of magnets is unconfined.

\* \* \* \* \*